United States Patent [19]

Akagawa et al.

[11] Patent Number: 4,894,745

[45] Date of Patent: Jan. 16, 1990

[54] METHOD AND APPARATUS FOR PROTECTING AGAINST SEMICONDUCTOR POWER CONTROL FAILURE

[75] Inventors: Eiji Akagawa; Hideo Obi; Yumiko Asano, all of Hyogo, Japan

[73] Assignee: Mitsubishi Denki Kabushiki Kaisha, Tokyo, Japan

[21] Appl. No.: 852,486

[22] Filed: Apr. 16, 1986

[30] Foreign Application Priority Data

Apr. 16, 1985 [JP] Japan .................................. 60-83020

[51] Int. Cl.⁴ ............................................. H02H 7/09
[52] U.S. Cl. .......................................... 361/42; 361/33
[58] Field of Search ...................... 361/23, 28, 29, 33, 361/42, 43, 49, 92, 18

[56] References Cited

U.S. PATENT DOCUMENTS

| | | | |
|---|---|---|---|
| 3,450,947 | 6/1969 | Rogers, Sr. .............. | 361/49 |
| 3,708,719 | 1/1973 | Ishikawa .................. | 361/23 |
| 3,796,918 | 3/1974 | DeForest et al. ......... | 361/29 X |
| 3,823,342 | 7/1974 | Burr et al. ............... | 361/33 |
| 3,958,164 | 5/1976 | Hess ......................... | 361/33 X |
| 4,042,966 | 8/1977 | Newell et al. ........... | 361/29 X |
| 4,196,462 | 4/1980 | Pohl ......................... | 361/33 |
| 4,412,162 | 10/1983 | Kitamura .................. | 361/29 X |

FOREIGN PATENT DOCUMENTS 6083020 2/1977 Japan ..
55-18818 2/1980 Japan .

Primary Examiner—William M. Shoop, Jr.
Assistant Examiner—Anthony Wysocki
Attorney, Agent, or Firm—Sughrue, Mion, Zinn, Macpeak & Seas

[57] ABSTRACT

A protection circuit for preventing an over-current condition if the semiconductor power controller in an electric train power control circuit is defective. The power controller is connected in series through first and second switches to a D.C. power source. A capacitor is also connected to the power source through the two switches and through a charging resistor connected in parallel with the second switch. When the first switch is closed, the capacitor is charged through the first switch and the resistor. After the capacitor voltage reaches a set reference voltage during a predetermined time interval, the second switch is closed to permit the power control equipment subsequently to apply power to the driving motor of the train. If the capacitor voltage does not reach the reference voltage during the predetermined time interval, then the second switch remains open and the first switch is re-opened to completely disconnect the power control equipment from the D.C. power source.

6 Claims, 5 Drawing Sheets

METHOD AND APPARATUS FOR PROTECTING AGAINST SEMICONDUCTOR POWER CONTROL FAILURE

BACKGROUND OF THE INVENTION

1. Field of the invention

This invention relates to the protection of a power semiconductor device which controls the power applied to either an A.C. or D.C. driving motor of an electric rolling stock or train.

2. Description of the Prior Art

Recently, a power semiconductor device, such as chopper equipment or inverter equipment, comprising power semiconductors has been employed for driving electric rolling stock 1, such as a train, in order to reduce power consumption and maintenance cost and to improve the performance.

FIG. 1 shows one example of the main circuit in such an inverter equipment for an A.C. drive motor. In FIG. 1, reference numeral 1 designates a current collector for collecting direct current applied, for instance, to a power line 1a from a power source, such as a substation (not shown); 2, a first switch; 3, a second switch; 4, a charging resistor for a filter capacitor 6; 5, a filter reactor forming an inverted L-shaped filter circuit with the filter capacitor 6; 7, an inverter power control means or circuit comprising semiconductor thyristors; and 9, a three-phase induction motor which is the main electric motor for driving electric rolling stock such as a train. The aforementioned circuit elements 2 through 7 form an inverter equipment 8.

The operation of the circuit thus organized will now be described. When an operation instruction is applied, for instance, by a train operator, the first switch 2 is closed, so that the filter capacitor 6 is charged through a circuit consisting of the current collector 1, the first switch 2, the charging resistor 4 and the filter reactor 5. In this case, the power control means or circuit 7 is not in operation, and, therefore, no current flows in the power control means 7 and induction motor 9. After a lapse of a predetermined period of time at which the filter capacitor 6 has charged up, the second switch 3 is closed to short-circuit the charging resistor 4. When the second switch 3 is turned on in this manner, the power control means 7 starts its operation to convert D.C. voltage into three-phase A.C. voltage to control the three-phase induction motor to drive the electric rolling stock.

One example of the sequences for closing the first and second switches 2 and 3 will be described in more detail with reference to FIG. 2 in which is shown a control circuit to be used for the inverter equipment in FIG. 1. In FIG. 2, the operation instruction 19 issued from an operation equipment (not shown) operated by the train operator is applied to an electromagnetic valve 20 provided in association with the first switch 2, thereby exciting the electromagnetic valve 20. Upon energization of the same, the first switch 2 is closed and an auxiliary contact 21 of the first switch 2 is closed. Upon closure of the auxiliary contact 21, an electromagnetic valve 23 provided in association with the second switch 3 is excited due to an application of a voltage on a power line 22 connected to a D.C. source for the control circuit, and the second switch 3 is closed. When the second switch 3 is closed, its auxiliary contact 24 is closed, whereby a power on signal 26 is inputted to a control circuit 25 for controlling the power control means 7. In response to both the power on signal 26 and the operation instruction 19, the control circuit 25 instructs the power control means 7 to start its operation.

The resistance of the charging resistor 4 has been set to a value R with which, during the charging operation, the voltage of the filter capacitor 6 is not oscillated by resonance of the filter reactor 5 and the filter capacitor 6. If an inductance L of the filter reactor 5 is set to 12 mH, a cpacitance C of the filter capacitor 6 to 3,600 F. and a resistance R of the charging resistor 4 to 3.8, then the resistance R of the charging resistor 4 needs to meet the following relation in order to suppress an LC resonance:

$$R > 2\sqrt{\frac{L}{C}} \tag{1}$$

Putting the values of L and C into the above, $$2\sqrt{\frac{L}{C}} = 3.65 < 3.8 = R \tag{2}$$

It can be appreciated that the given values of L, C and R meet the above relation (1), thus the LC resonance can be suppressed.

The time required for charging up the filter capacitor 6 is determined by the inductance L of the filter reactor 5, the capacitance C of the filter capacitor 6 and the resistance R of the charging resistor 4. A charging time constant of the filter capacitor 6 is caluculated by:

$$= C \cdot R = 13.7 \text{ msec.} \tag{3}$$

Since it takes about 100 msec for the second switch 3 to be closed starting from the exciting of the electromagnetic valve 23, the charging of the filter capacitor 6 has already been completed when the second switch 3 is closed. The timing chart for explanation of the above relation is shown in FIG. 3.

FIG. 4 is a circuit diagram showing one example of the power control means 7 for controlling an A.C. drive motor 9. In FIG. 4, reference numerals 7U through 7Z designate gate-turn-off type thyristors in the arms of an inverter. The order of firing of the thyristors 7U through 7Z is controlled by gate signals to obtain three-phase A.C. output voltage from D.C. input voltage. The control operation will not be described here, it being well known in the art.

FIG. 5 shows one example of the main circuit of a chopper equipment. In FIG. 5, reference numeral 10 designates a chopper power control means comprising semiconductor thyristors; 2 through 6, the same circuit elements as those in FIG. 1; 12, a free wheeling diode; 13, a main D.C. driving motor having an armature 14 and a field system 15; and 16, a main smoothing reactor. The circuit elements 2 through 6 and 10 form the chopper equipment 11.

Similarly as in the case of the inverter equipment of FIG. 1, when an operation instruction is applied to the chopper equipment, for instance, by the operator, the first switch 2 is turned on. Then, when the second switch 3 is closed, the chopper power control means 10 starts the chopping operation, to convert D.C. voltage into variable continuous voltage, to control the main D.C. motor 13.

The free-wheeling diode 12 is provided for the reflux of a current to be frown into the chopper power control means 10 when the latter becomes off. The current flowing in the diode 12 gradually decreases.

Two typical conventional equipments have been described. In such conventional equipments, if the main circuit is grounded, for instance, by defective semiconductor elements upon closure of the second switch 3, a ground-leading current flows through a circuit consisting of the current collector 1, the first switch 2, the second switch 3, the filter reactor 5 and the power semiconductor device 7 or 10 from the power line 1a, as a result of which an over-current detecting means located, for instance, in the substation supplying electric power to the electric rolling stocks or trains, would be operated for safety and security. The main circuit is grounded if, for instance, the thyristors 7U and 7X in FIG. 4 simultaneously failed. In such a case, the supply of electric power to the power line 1a is interrupted, and, therefore, no electric power is supplied to other trains running on lines served by the same power source.

SUMMARY OF THE INVENTION

Accordingly, an object of this invention is to eliminate the above-described difficulty. More specifically, an object of the invention is to provide an electric rolling stock or train protecting method and apparatus in which ground faults, can be detected before the above-noted over-current condition occurs.

More specifically, and in summary, in a power semiconductor control equipment according to the invention, the filter capacitor is charged through the charging resistor by closing a first switch, and the voltage of the filter capacitor thus charged is detected to close a second switch when the capacitor voltage reaches a predetermined reference voltage. If the filter capacitor is not charged to the reference voltage, the first switch is opened, thereby preventing a ground fault on the power line. In other words, the protecting method and apparatus of the invention prevents the flow of over-current which otherwise would have been detected in the substation as a ground fault.

BRIEF DESCRIPTION OF THE DRAWING

FIGS. 7A through 7F are timing chart illustrating the operation of the embodiment shown in FIG. 6.

FIG. 8 is a circuit diagram showing a control circuit for use in the circuit shown in FIG. 6.

FIG. 9 is a circuit diagram for illustrating the operation of the circuit shown in FIG. 8.

In these figures, like parts are designated by like reference numerals.

DETAILED DESCRIPTION OF A PREFERRED EMBODIMENT

One preferred embodiment of the invention will be described with reference to the accompanying drawings including FIGS. 6 through 9.

Figure 6:
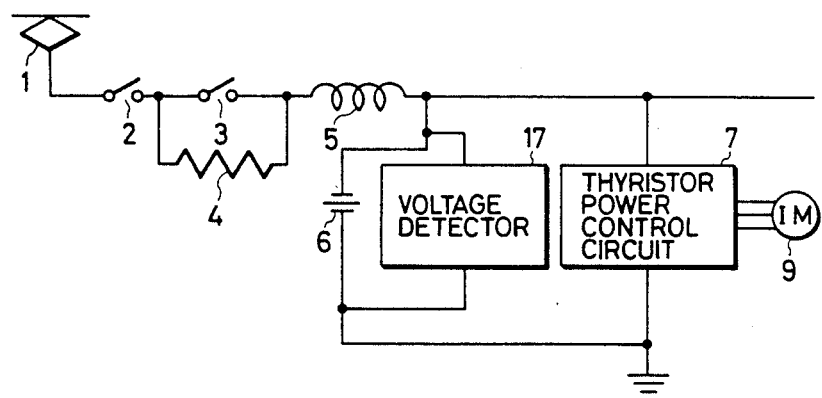
FIG. 6 is a circuit diagram, partly in block diagram form, showing one preferred embodiment of this invention.
Figures 7A, 7B, 7C, 7D, 7E, 7F, 8, 9:
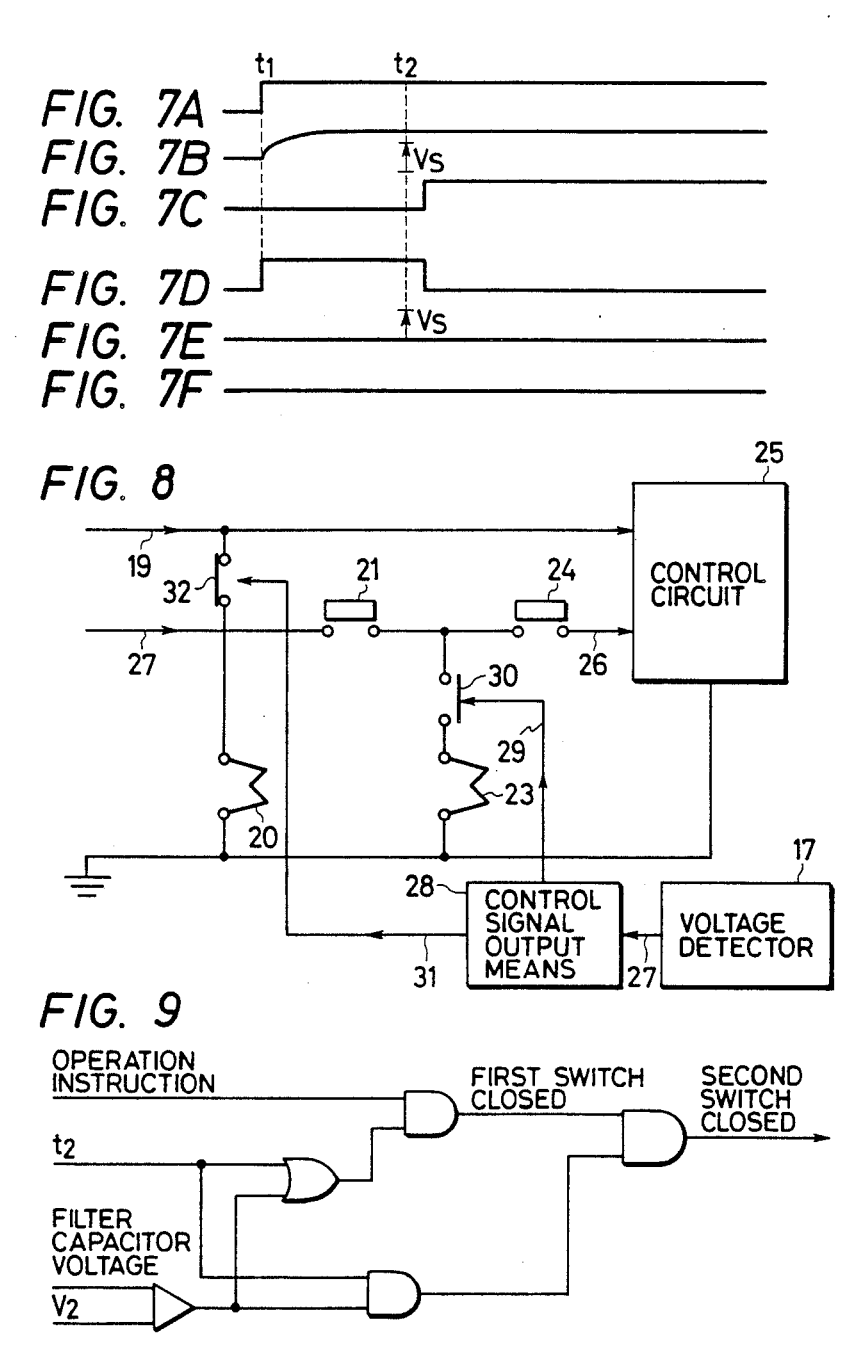

In FIG. 6, reference numeral 17 designates a voltage detecting means, such as a D.C. potential transformer (DCPT), for detecting the voltage of the filter capacitor 6. The DCPT is sold on the market, e.g., as a trade name "LEM Module" sold by Hakuto Co., Ltd., in Japan. In the circuit of FIG. 6, in response to an operation instruction, the first switch 2 is closed at the time instant $t_1$ as indicated in FIG. 7A, and the filter capacitor 6 starts charging as shown in FIG. 7B. The voltage across the filter capacitor 6 thus charged is detected by the voltage detecting means 17. Thereafter, when the voltage of the filter capacitor 6 is higher than a reference value $V_S$, it is determined that the power control means 7 is operating satisfactorily, and at the time instant $t_2$ the second switch 3 is turned on. Furthermore, in response to a signal fed from an auxiliary contact (to be described later) provided in gang with the second switch 3, as indicated in FIG. 7C, the power control means 7 starts its operation.

The reference value $V_S$ is set to be lower than the lowest value in the range of variation of the line voltage, for example, if the rated line voltage is 1500 V and the range of its variation is between 900 V and 1800 V, the reference voltage Vs is set to be 500 V lower than 900 V. In this case, the second switch 3 is turned on when the voltage across the filter capacitor is above 500 V in the above example.

However, when, as shown in FIG. 7D, the filter capacitor 6 or the power control means 7 is grounded, for instance because of the failure of the power control means 7, the supply voltage is developed across the charging resistor 4, and, therefore, the voltage of the filter capacitor 6 cannot increase. Therefore, at the time instant $t_2$, the voltage of the filter capacitor 6 being lower than the reference value $V_s$ as shown in FIG. 7E, it is determined that, for instance, the power control means 7 has failed or is out of order, so that the second switch 3 is prevented from being closed and the first switch 2 is opened, thereby electrically disconnecting the main circuit from the power source (such as the substation). Thus, the power control means 7 is not operated as shown in FIG. 7F.

Figure 1:
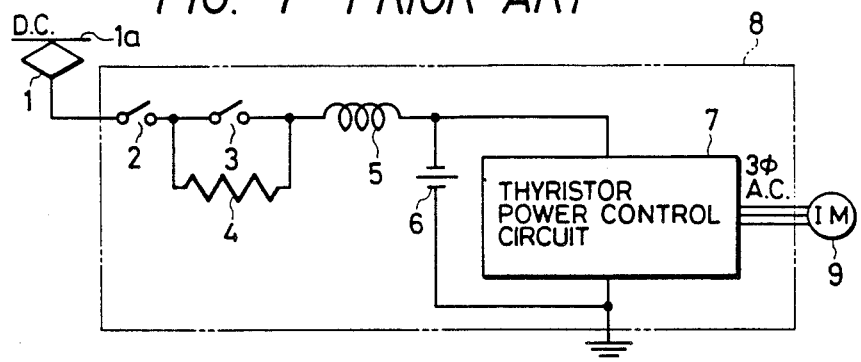
FIG. 1 is a circuit diagram, partly in block diagram form, showing one example of a conventional power semiconductor device for driving electric rolling stock.
Figure 2:
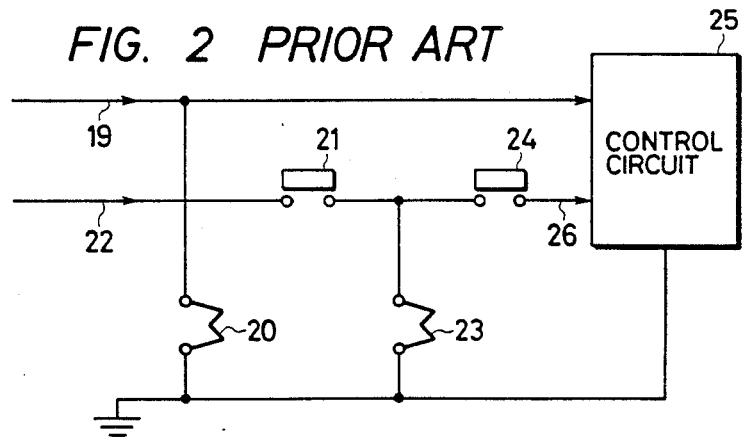
FIG. 2 is a circuit diagram showing a control circuit for use in the circuit shown in FIG. 1.
Figure 3:
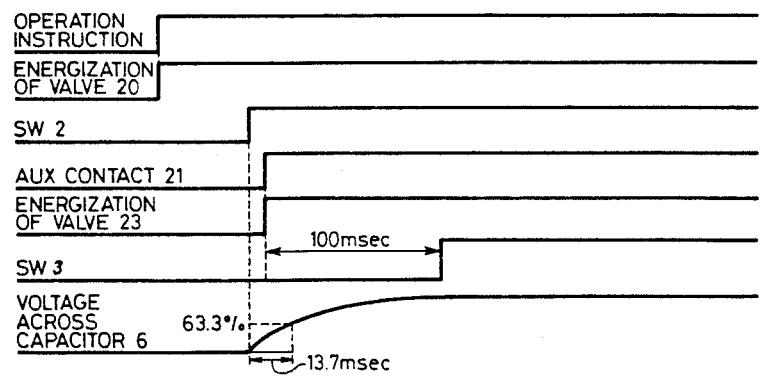
FIG. 3 is a timing chart for explanation of the circuit shown in FIG. 2.
Figure 4:
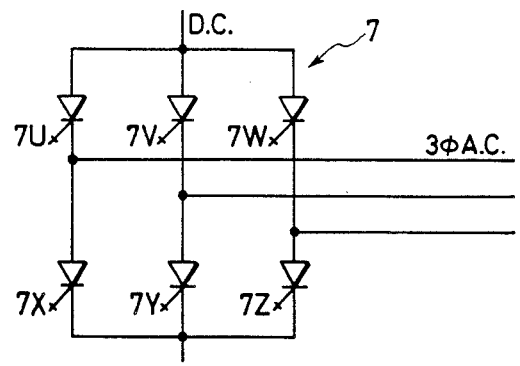
FIG. 4 is a circuit diagram showing one type of power control circuit which is illustrated in FIG. 1.
Figure 5:
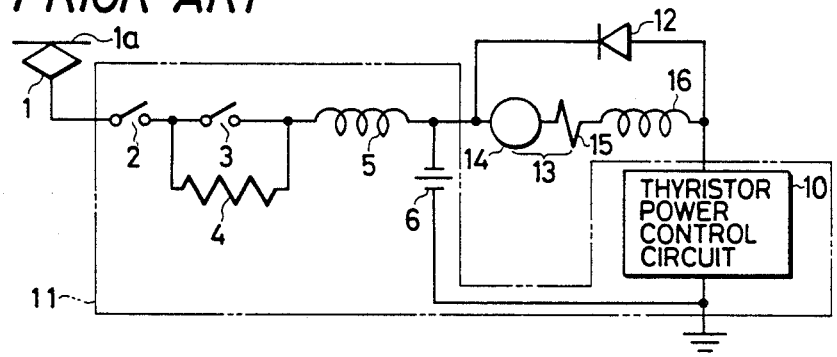
FIG. 5 is a circuit diagram, partly in block diagram form, showing another type of conventional power semiconductor control circuit.

One example of the sequence for closing the first and second switches 2 and 3 will be described in more detail with reference to FIG. 7. Reference numerals 19 through 26 designate the same elements or signals as shown and described with reference to FIG. 2. In response to the operation instruction, an electromagnetic valve 20 of the first switch 2 is excited and an auxiliary contact 21 of the first switch 2 is closed. From this time instant, the filter capacitor 6 starts charging. When the voltage across the filter capacitor 6 exceeds the reference value $V_S$, a detection signal 29 is produced from a control signal output means 28 and in response thereto, a contact 30 is closed. An electromagnetic valve 23 of the second switch 3 is excited by the voltage on the power line 27 and the second switch 3 is closed. Upon closure of the second switch, its auxiliary contact 24 is closed and a power on signal 26 is inputted to a control circuit 25 provided in association with the power control means 7. When both the power on signal 26 and the operation instruction 19 are applied to the control circuit 25, the power control means 7 starts its operation.

When the detected voltage 27 of the filter capacitor 6 does not reach the reference value $V_S$, the detection signal 29 is not produced from the control signal output means 28 but a fault signal 31 indicative of the failure of the power control means 7 is produced. In response to the fault signal 31, the contact 32 is opened, and the electromagnetic valve 20 of the first switch 2 is not excited, and then the first switch 2 is opened.

FIG. 9 is a circuit diagram for producing the instruction signal for closing the second switch.

Thus, according to the method and apparatus of the invention, before the power control means 7 starts its operation, the voltage of the filter capacitor 6 is detected, and when it is determined that the voltage of the capacitor is abnormal, the main circuit is immediately disconnected from the power source, thereby preventing additional damage and improving the security and safeness of the electric rolling stock.

We claim:

1. In a power control, circuit including an electric power control device which is operable to control the application of power from a D.C. source through a current collector to a driving motor of an electric train; the circuit including, connected in a series circuit between the current collector and the power control device equipment, a first switch, a parallel circuit of a normally open second switch and a resistor, and an inductor, and also including a capacitor connected to the series circuit, said capacitor, when said first switch is closed, being charged through a charging path, consisting of said first switch, said resistor and said inductor, to a charge voltage in a predetermined time interval set by the time constant of the charging path, and after the predetermined time interval said second switch being closed and subsequently said power control device being operated to apply power to the driving motor;

a method of protecting said power control device comprising the steps of;

determining for the capacitor a reference charge voltage which is lower than the lowest value in a range of voltage variation of said D.C. source;

detecting the voltage on the capacitor during the predetermined time interval; and if the detected voltage does not reach said reference charge voltage during said predetermined time interval maintaining second switch in an opened state.

2. The method according to claim 1, further comprising a step of re-opening said first switch if the detected voltage does not reach said reference charge voltage during said predetermined time interval.

3. In a power control circuit including an electric power control device which is operable to control the application of power from a D.C. source through a current collector to a driving motor of an electric train; the circuit including, connected in a series circuit between the current collector and the power control device, a first switch, a parallel circuit of a normally open second switch and a resistor, and an inductor, and also including a capacitor connected to the series circuit, said capacitor, when said first switch is closed, being charged through a charging path, consisting of said first switch, said resistor and said inductor, to a charge voltage in a predetermined time interval set by the time constant of the charging path, and after the predetermined time interval said second switch being closed and subsequently said power control device being operated to apply power to the driving motor;

apparatus for protecting said power control device comprising:

means for determining for the capacitor a reference charge voltage which is lower than the lowest value in a range of voltage variation of said D.C. source;

means for detecting the voltage on the capacitor during the predetermined time interval; and means, responsive to the detected voltage, for controlling the closure of said second switch, said second switch being maintained opened if the detected voltage does not reach said reference charge voltage during said predetermined time interval.

4. The apparatus according to claim 3, further comprising means, responsive to the detected voltage, for re-opening said first switch if the detected voltage does not reach said reference charge voltage during said predetermined time interval.

5. The apparatus according to claim 4, wherein said electric power control device is an inverter circuit, and said driving motor is an A.C. motor.

6. The apparatus according to claim 4, wherein said electric power control device is a chopper circuit, and said driving motor is a D.C. motor.

* * * * *